United States Patent [19]

Kuusinen et al.

[11] Patent Number: 4,486,647
[45] Date of Patent: Dec. 4, 1984

[54] METHOD OF WELDING ALUMINUM TO TITANIUM AND A WELDED JOINT SO PRODUCED

[75] Inventors: Osmo Kuusinen; Mikko Rantanen; Olavi Rintanen; Reijo Pajunen; Pekka Oittinen; Kalevi Valtanen, all of Äetsä, Finland

[73] Assignee: Finnish Chemicals Oy, Aetsa, Finland

[21] Appl. No.: 374,283

[22] Filed: May 3, 1982

[30] Foreign Application Priority Data

May 7, 1981 [FI] Finland .................................. 811401

[51] Int. Cl.³ ............................................. B23K 9/23
[52] U.S. Cl. ........................... 219/137 WM; 228/238; 428/660
[58] Field of Search .......... 219/137 WM, 137 R, 118, 219/121 LD, 121 ED; 228/238; 428/654, 660

[56] References Cited

U.S. PATENT DOCUMENTS 2,761,047  8/1956  Meredith ........................ 219/137 R
3,473,216  10/1969  Webb ................................. 428/660

FOREIGN PATENT DOCUMENTS 1237090  6/1971  United Kingdom .

OTHER PUBLICATIONS

American Society for Metals, Metals Handbook, 8th Edition, vol. 6, Welding and Brazing, 1971, p. 375.

Primary Examiner—C. L. Albritton
Assistant Examiner—Alfred S. Keve
Attorney, Agent, or Firm—Bucknam and Archer

[57] ABSTRACT

Aluminum is joined to titanium by welding using so much welding energy that the temperature on the titanium side of the alloying melt boundary remains below 2000° C., while titanium and aluminum do, however, melt at the joint interface.

In a weldment thus obtained, the base material alloys and aluminum filler of which contain at maximum 10% titanium, there is in the vicinity of the interface between titanium and aluminum only a discontinuous $\beta$-phase, dispersed in the aluminum matrix.

10 Claims, 5 Drawing Figures

METHOD OF WELDING ALUMINUM TO TITANIUM AND A WELDED JOINT SO PRODUCED

BACKGROUND OF THE INVENTION

The present invention relates to a method of joining aluminum to titanium by welding and by using so much welding energy that the titanium and the aluminum melt at the interface at the joint. In addition, the present invention relates to weldment in which titanium has been joined to aluminum by welding.

In the electrolysis of sodium chloride, a titanium mantle is nowadays often used, at least on that side of the cell to which the anodes are attached. In this case the basic material of the anodes is usually titanium. The cell mantle to one side of which the anodes are attached, or the ends of the anodes passing through the cell mantle, is/are then attached with a bolt joint to aluminum current conductors. Such bolt joints cause transfer resistances and thereby losses of energy, and they are therefore undesirable.

Because it is exactly in electrolytic cells that there has been a need for joining aluminum and titanium to each other, several methods have been developed for this purpose.

In British Pat. No. 1,125,493 rolling, explosive welding and resistance welding are mentioned as methods. Since in rolling a great force is required for producing a metallurgical bond between aluminum and titanium, the method is cumbersome. It must be limited to very thin sheets, and the method is not suitable for attaching thick conductor rails or the aluminum support structures of the tanks. Furthermore, rolling has to be carried out in machine shops equipped with special devices, and it is not suitable for being carried out on site. Titanium and aluminum can be joined to each other by explosive welding. However, the method is very cumbersome and expensive for attaching thick current rails to the titanium mantle of an electrolytic cell. In addition, explosive welding can be carried out only in plants provided with special equipment. If the titanium mantle of an electrolytic cell is in this manner 'coated' with an aluminum sheet, the aluminum current rails must further be attached by separate welding to the aluminum current conductors. In addition, making pipe units in such a Ti-Al mantle is complicated, owing to these two materials of the mantle, if the situation is compared with a mantle consisting of only titanium. Since aluminum is a good conductor of electricity and heat, only thin aluminum sheets can be attached to titanium sheets by resistance welding. Thus, the maximum thickness indicated in the said patent for the Al sheets to be attached is approx. 3 mm.

British Pat. No. 1,127,484 mentions soldering and brazing in addition to explosive welding, in which case a flat titanium sheet is attached to relatively thick aluminum base sheets. Soldering and brazing are very cumbersome operations, because first an oxide film has to be removed from both the titanium and the aluminum, whereafter the pieces must be kept free of oxide, for example in a vacuum or in a shield gas, until the welding has been carried out. Furthermore, several fillers are usually required.

The patent also includes a mention of the casting, from aluminum, protrusions which protrude from the cell. The casting operation is difficult to carry out, especially when what is in question is relatively thick current rails. If casting were used for attaching the current rails, an oxide film left on the surface of the titanium, the melting point of the oxide film being much higher than the casting temperature, would produce a layer having electric resistance and thereby losses of energy when conducting current. Also for this reason, casting cannot be used for current rails. The method is also out of the question in the attaching of the support structures of large tanks, because the method would be difficult to carry out in practice and the said oxide film would weaken the strength of the structure.

In British Pat. No. 1,522,622, fusion welding methods comparable to casting are used. In this case, aluminum pins are attached by friction welding to the mantle of a titanium electrolytic cell. The pins are rotated by a hydraulic motor so that the contact surfaces of the pins, against the titanium, melt. The method is very cumbersome, because when conductor rails are used, the pins must also be connected to the rails in some manner. In addition, this joining method is limited to rotatable pieces.

The above-mentioned patent also mentions capacitor discharge welding. This is also a kind of resistance welding, in which the pieces to be welded are pressed against each other, whereafter an electric discharge is conducted through the pieces, at which time the aluminum melts. The high electrical and thermal conductivity of aluminum sets limits on the thickness of the pieces to be joined or on their cross sectional surface, thus limiting the method to use with relatively thin pieces or pieces with a small cross sectional surface, because in thick pieces electricity and heat are transferred rapidly in the lateral direction, in which case sufficient thermal energy for carrying out the welding is not obtained in the areas to be welded.

The special brazing method disclosed in German patent application DOS No. 2735059 requires several steps and fillers as well as special equipment. For this reason the method is cumbersome.

In British Pat. No. 1,237,090 it is disclosed that titanium could be welded by TIG welding to aluminum. It must be noted that what is in question is not actual gas arc welding but a fusion process, since no filler material (welding wire) is used. It is noted in the Patent that, in order to be resilient, the parts to be joined must be sufficiently thin. It can be noted that it is not possible to join thicker pieces together by the method. The method cannot be used for normal welded joints, since the composition of the melt is uncontrolled and, for this reason, pieces of Ti and Al cannot be reliably joined to each other. On the other hand, the patent does not disclose how the melt could be controlled except that the thickness of the Al must be at minimum 4 times greater than the thickness of the titanium to be joined to it. Such thickness requirements would greatly limit the range of constructions.

All such complicated methods are, of course, due to the fact that it has not been possible to apply gas arc welding to welding titanium to aluminum, because brittle compounds of the metals are thereby produced.

In U.S. Pat. No. 4,264,426, however, gas arc welding has been applied to attaching aluminum current conductors directly to, for example, the titanium mantle of an electrolytic cell.

In Finnish Pat. No. 58,164, gas arc welding has been used for the attaching of aluminum support structures and stiffeners to titanium tanks, whereby an uncomplicated and strong support structure has been obtained for the tank, and the previously used complicated constructions have been avoided.

Even though it has been possible to apply gas arc welding, the controllability of the method has not, however, been the best possible.

SUMMARY OF THE INVENTION

Now it has been observed, surprisingly, that by using for the welding a certain temperature which can be easily controlled by means of commercially available devices, welding can be performed reliably and repeatably, so that a firm joint is obtained between titanium and aluminum, a joint which also withstands charges of temperature.

According to the present invention, only so much energy is used for the welding that the temperature on the titanium side of the alloying melt boundary is about 2000° C. or remains below 2000° C., but above the melting point of titanium. The temperature of the melt in the middle of the weld is in this case at maximum 1500° C. and preferably on the average 500°–800° C. below the highest allowed temperature of the melt on the titanium side. On the other hand, on the aluminum side the temperature of the melt exceeds the melting point of aluminum. In a weldment thus obtained the $\beta$-phase in the vicinity of the interface between titanium and aluminum is mainly only discontinuous $\beta$-phase (Al$_3$Ti), dispersed in an aluminum matrix. When welding by the method according to the invention, the size of molten metal can be maintained small so that as little titanium as possible dissolves in it and preferably at maximum 15% titanium precipitates in the aluminum matrix in the vicinity of the titanium interface. In this connection the alloying melt boundary means the surface of the gab.

DESCRIPTION OF THE DRAWINGS

In FIGS. 1a, 1b, 2a, and 2b, titanium is indicated by reference numeral 1, aluminum by 2 and the welded joint by 3.

DESCRIPTION OF THE PREFERRED EMBODIMENTS

Figure 1A:
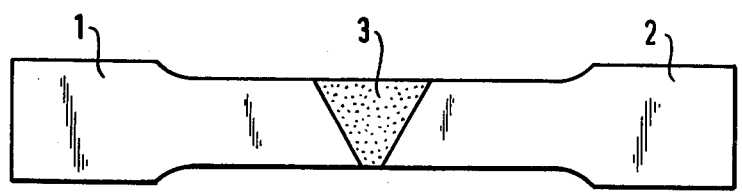
FIGS. 1a and 2a depict top views.

In the method according to the invention, any gas arc welding methods can be used, such as TIG, MIG and plasma welding, and also welding methods in which energy is not introduced by means of a welding electrode or electrodes but directly, as in laser welding, for example.

In welding titanium and aluminum to each other using an aluminum filler (welding wire) the essential characteristic is that at the alloying melt boundary on the titanium side the temperature is at maximum about 2000° C., preferably closer to the melting point of titanium (1672° C.), e.g. 1750° C.

If the welding is carried out using too high an amount of energy, the temperature rises clearly above 2000° C., whereby a large pool of molten metal is produced, and a large amount of titanium is alloyed with the aluminum. When such a melt solidifies, titanium-aluminum compounds are produced in large quantities on the titanium side joint boundary: $\gamma$, $\delta$ and $\beta$-phases (ASTM Metals Handbook, Vol. 8, Metallography, Structures and Phase Diagrams, 8th Ed. 1973, p. 264). These phases form continuous layers in the order $\gamma$, $\delta$, $\beta$, starting from the surface of the titanium. Of these, at least the $\beta$-phase is brittle. Since the thermal expansion coefficient of aluminum is at least three times that of titanium, great stresses are formed in the boundary zone between the titanium and the aluminum weld, when the welded area cools down. Under the influence of these stresses the continuous brittle $\beta$-phase layer fractures and the weld is broken at the boundary zone between the $\beta$- and $\gamma$-phases. If the temperature on the titanium side of the alloying melt boundary is maintained at about 2000° C. or below this temperature, considerably less titanium dissolves in the aluminum, and when the weld solidifies, a thin, discontinuous $\beta$-phase layer (Al$_3$Ti) is formed at the boundary between the titanium and the molten metal and dispersed $\beta$-granules are formed in the aluminum matrix in the vicinity of the titanium. Such a joint is strong, since no continuous brittle $\beta$-phase layer is formed at the boundary of titanium.

On the aluminum side of the alloying melt boundary the temperature must be higher than the melting point of aluminum, i.e. above 660° C. If the temperature at the alloying melt boundary on the titanium side rises above 2000° C., the temperature on the aluminum side of the alloying melt boundary rises so high that a good joint is no longer obtained. In practice, the average temperature of the middle of the melt sets at about 500°–800° C. lower than the maximum temperature of the titanium side melt. If on the titanium side the temperature of the alloying melt boundary is at maximum about 2000° C., the average temperature hardly rises above 1500° C., and the joint on the aluminum side will be good. Nor are in this case significant amounts of $\gamma$- and $\delta$-phases, nor a continuous $\beta$-phase layer, formed at the titanium boundary, and so the welded joint as a whole will be strong. In principle it is possible to operate even at a lower temperature than that presented above, since considerable alloying is not necessary for the joint. In such a case there is, however, a risk of a cold flow, which, in turn, weakens the strength of the weld. The practical lower limit for the temperature of the middle of the melt is 1000°–1100° C.

It has been proposed above that the pool of molten metal must be as small as possible in order that the melting of titanium and aluminum be as slight as possible. This is, of course, a relative concept, because in, for example, TIG welding there is easily produced a larger melt than in laser welding, in which the beam of energy can, when necessary, be focused on a small spot.

In addition, it should be noted that the aluminum filler (welding wire) or the aluminum base (the piece to be welded) can also consist of alloys in which the concentration of aluminum does not correspond to the concentrations of pure or nearly pure aluminum. In this case the base material alloys and the aluminum filler must not contain titanium more than 10%, preferably it should contain less than 5% titanium.

It is evident from the above that within the suggested temperature range the alloying of titanium and aluminum can be made slight, whereby the welded joint will be strong. In practice, it is easy to obtain the above-mentioned temperature range by controlling the amounts of energy used for the welding. For example, in MIG welding this is effected by means of voltage and in TIG welding by means of the strength of the current. In addition, the welding process can be adjusted by means of the feed rate of the welding wire. Examples 1-3 illustrate the control of the welding process.

When the welding method according to the invention is used, there are no limitations regarding the thickness of the titanium and the aluminum. For example, butt joint welding can be carried out on equally thick Ti and Al pieces. When normal fillet welding is carried out, the mutual thickness proportions of the pieces to be welded have no significance, since the pieces do not melt throughout, but the welded joint of the Ti interface is formed from the welding filler (welding wire).

By the welding method according to the invention, it is possible to weld advantageously aluminum current rails to, for example, the titanium mantle of an electrolytic cell, in which case the joining method itself is simple. In addition, an advantage is gained in that no transfer resistance is created between the titanium and the aluminum, as is, for example, when bolt joints are used.

The method of welding titanium and aluminum to each other according to the invention can be advantageously applied also to the making of support structures and stiffeners for titanium tanks, crystallizers and other apparatuses. If what is concerned is a tank, usually a support structure surrounding the entire tank is required. It has previously been possible to carry out this by, for example, welding a relatively thin flange of titanium around a titanium tank. Holes at sufficient, regular intervals are drilled in this flange. The actual steel stiffener, having corresponding holes, is then attached by means of bolts to the titanium flange welded to the tank wall. By using the Al welding according to the invention, an aluminum stiffening ring can be welded directly to the wall of a titaniumtank. This requires at maximum the same amount of welding work as does the attaching of a titanium flange, but the entire complicated steel stiffener construction is eliminated. When titanium is welded, it is for practical reasons often necessary to use TIG welding, whereas the aluminum ring can also be welded by MIG welding, whereby the welding time is reduced to about one-half, because TIG welding is much slower to carry out than MIG welding.

The invention is described below in greater detail with the aid of examples.

EXAMPLE 1

Welding transformer LI-350K (Kemppi Oy, Finland) was used for TIG welding. An aluminum bead was welded to a 6-mm-thick Ti sheet using an about 99-percent Al wire having a diameter of 3 mm as the welding wire. The arc voltage of the machine was 29-34 V and the nominal current was adjusted to 75 A and the welding rate to about 200 mm/min. To control the melt, the Al welding wire was fed in behind the tungsten electrode. The highest temperature of the titanium was about 1900° C. In this case a good welded joint was obtained, in which the alloying close to the interface of Ti was about 5%.

When the nominal current was raised to 80 A, the highest temperature of the titanium rose to about 2100° C. In this case the alloying close to the interface of the titanium was very extensive, about 20%, and the weld obtained was brittle.

EXAMPLE 2

A series of MIG welding tests were performed. Welding transformer RA 325 (Kemppi Oy, Finland) was used.

An Al rail having a cross sectional area of 20 mm × 35 mm was welded to a 5 mm titanium sheet. The filler used was an about 99-percent Al wire having a diameter of 1.2 mm. The voltage of the apparatus was set at different values. A good welding result was obtained with voltage values of 31-25 V. With values above 31 V a brittle weld was obtained, and with values below 25 V cold flow began to appear in the welded joint, reducing the strength of the weldment.

The quality of the welded joints can be measured in different ways. One common way is to report the so-called 0.2% limit, which indicates the force which is required to produce an elongation of 0.2%. Another commonly used measure of strength is the breaking strength.

EXAMPLE 3

Below, results are shown regarding different types of tension bars on which tensile tests were carried out according to SF Standard 3173.

Figure 1B:
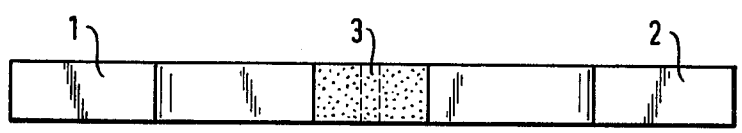
FIGS. 1b and 2b depict side views of specimens welded by the method according to the invention.
Figure 2A:
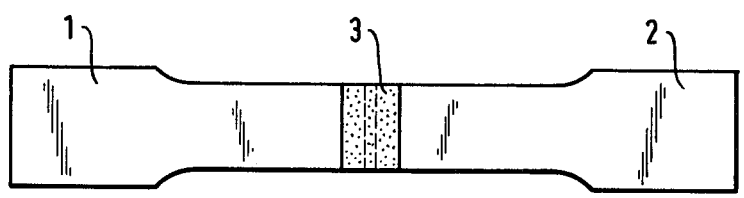
Figure 2B:
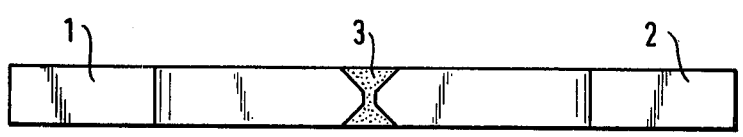
Figure 3:
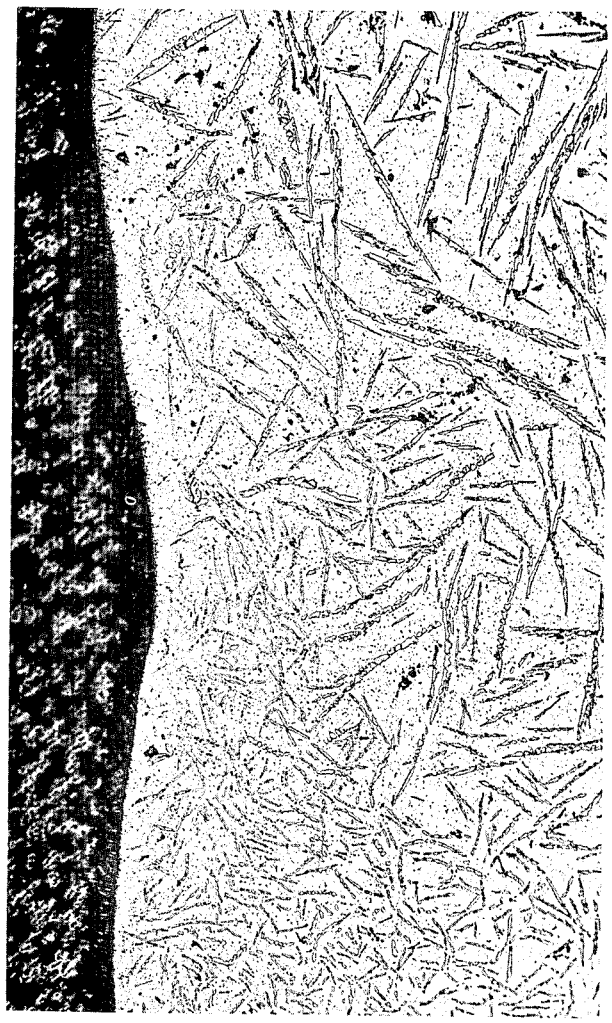
FIG. 3 is a microscopic photograph of a section perpendicular to the weldment, within the boundary zone between the material of the weldment and the titanium sheet in the tension bar, close to the root of the weld. The material of the weldment contains dispersed, broken $\beta$-granules.

| No. of bar | Width of bar mm | Thickness of bar mm | 0.2 limit N/mm$^2$ | Breaking strength N/mm$^2$ | Specimen | Time of test, calculated from time of welding |
| --- | --- | --- | --- | --- | --- | --- |
| 1 | 14.9 | 9.7 | 56 | 94 | FIG. 1 | 1 week |
| 2 | 15.0 | 10.0 | 54 | 96 | FIG. 1 | 1 week |
| 3 | 15.0 | 9.8 | 94 | 102 | FIG. 2 | 1 year |
| 4 | 15.0 | 9.8 | 94 | 114 | FIG. 2 | 1 year |
| 5 | 14.8 | 9.8 | 101 | 101 | FIG. 2 | 1 year |
| 6 | 15.5 | 9.7 | 130 | 193 | Only Al base | |
| 7 | 15.2 | 9.0 | 124 | 190 | | |

The values reported by the manufacturer for the materials used in the welding:

Ti (about 99.5% Ti) 0.2 limit ≧ 274 N/mm$^2$ breaking strength 390-540 N/mm$^2$

Al (97.2-99.2% Al) 0.2 limit ≧ 176 N/mm$^2$ breaking strength ≧ 216

Al-wire ∅ 1.2 mm 0.2 limit ≧ 59 N/mm$^2$ breaking strength ≧ 69 (about 99.5% Al)

The 0.2 limit of the tension bars is not fully comparable to the 0.2 limit of the materials, because the difference in the strengths of the base materials and the clearly lower strength of the welding filler result in the main elongation occurring in the weld. On the other hand, the breaking strength gives a good idea of the strength of the weld.

In specimens 1-2, the alloying was slight and the breaking strengths were greater than those for the Al filler. In specimens 3-5 the alloying was slight. The specimens were kept for about a year before the tests. In addition, the welded joints 3 were smaller than in bars 1-2. Age strengthening had occurred in specimens 3-5.

In all these cases the breaking occurred primarily in the middle of the welded joint and not, for example, at the interface between Ti 1 and Al 2.

It must be noted that, in connection with welding, partial softening occurs in the Al base material 2, because the used Al material 2 was solution heat-treated and artificially aged. The same softening also occurred in connection with the machining of the Al test specimens (Nos. 6–7), which is shown in that the results obtained were not the same as the values reported by the manufacturer. The results clearly show that the strength of weldment 3 is greater than that of the Al filler used, and thus the welding result obtained is to be considered good.

What is claimed is:

1. A method of welding aluminum to titanium comprising bringing a piece of aluminum adjacent to a piece of titanium to form a joint boundary between the two pieces, melting an aluminum or aluminum alloy filler such that it adheres to both pieces at the joint boundary, using enough welding energy that the titanium and the aluminum melt at the joint boundary, but using only enough welding energy that the temperature on the titanium side of the joint boundary is at maximum about 2000° C.

2. A method according to claim 1, comprising using at least enough welding energy that the temperature on the titanium side of the joint boundary is at minimum the melting point of titanium and preferably at minimum 1750° C.

3. The method according to claim 1, comprising using only enough welding energy that the temperature of a zone in the middle of the joint boundary is at maximum 1500° C.

4. The method of claim 3, comprising using enough welding energy that the temperature of the zone in the middle of the joint boundary is on the average about 500°–800° C. lower than the maximum allowed temperature of the joint boundary on the titanium side.

5. The method according to claim 1, comprising using enough welding energy that the temperature on the aluminum side of the joint boundary is above the melting point of aluminum.

6. A weldment in which titanium has been welded to aluminum or an aluminum base alloy by means of an alumnium ar aluminum alloy filler, in which the aluminum base alloy and the aluminum or aliminum alloy filler contain at maximum 10% titanium and wherein the phase in the vicinity of the interface and aluminum consists primarily of only discontinuous $\beta$-phase, dispersed in an aluminum matrix.

7. The weldment of claim 6, in which the aluminum base alloy and the aluminum filler contain at maximum 5% titanium.

8. The weldment according to claim 6, wherein in an aluminum matrix of a welded joint in the vicinity of an interface with titanium there is alloyed at maximum 15% titanium in the aluminum.

9. The weldment according to claim 8, wherein less than 8% titanium is alloyed in the aluminum.

10. The method according to claim 2, comprising using only enough welding energy that the temperature of a zone in the middle of the joint boundary is at maximum 1500° C.

* * * * *